United States Patent [19]

Laskey

[11] 3,929,741

[45] Dec. 30, 1975

[54] HYDROPHILIC ACRYLAMIDO POLYMERS

[75] Inventor: Richard A. Laskey, Washington, N.J.

[73] Assignee: Datascope Corporation, Paramus, N.J.

[22] Filed: July 16, 1974

[21] Appl. No.: 488,933

[52] U.S. Cl. ........ 260/79.3 M; 210/500; 260/2.1 E; 260/80.3 N; 260/998.11; 260/999
[51] Int. Cl.$^2$ ................... C08F 28/02; C08G 75/18
[58] Field of Search. 260/79.3 M, 79.3 MU, 80.3 N, 260/2.1 E

[56] References Cited
UNITED STATES PATENTS

| | | | |
|---|---|---|---|
| 3,033,833 | 5/1962 | Lefevre et al. | 260/79.3 MU |
| 3,332,904 | 7/1967 | Lacombe et al. | 260/79.3 MU |
| 3,349,063 | 10/1967 | Mayer et al. | 260/79.3 MU |
| 3,506,707 | 4/1970 | Miller et al. | 260/79.3 MU |
| 3,547,899 | 12/1970 | Arlt et al. | 260/79.3 MU |
| 3,692,673 | 9/1972 | Hoke | 260/79.3 MU |

FOREIGN PATENTS OR APPLICATIONS

| | | | |
|---|---|---|---|
| 582,581 | 9/1959 | Canada | 260/2.1 E |
| 704,373 | 2/1965 | Canada | 260/79.3 M |

*Primary Examiner*—Ronald W. Griffin
*Attorney, Agent, or Firm*—Steinberg & Blake

[57] ABSTRACT

Hydrophilic acrylamido polymers are provided. These polymers are obtained by polymerization of acrylamidoalkyl-sulfonic acid monomers and are capable of ingurgitating large quantities of liquids, particularly water as well as saline and biological fluids, without dissolution of the polymer network.

11 Claims, No Drawings

HYDROPHILIC ACRYLAMIDO POLYMERS

BACKGROUND OF THE INVENTION

The previously known hydrophilic polymers were prepared from glycol esters of the methacrylic and acrylic acids and are capable of retaining from 20% to 97% of water or an aqueous liquid. These polymers could be cross-linked only sparingly, up to a maximum of less than 1%. These hydrophilic polymers have many uses in the medical area, particularly as semi-permeable membranes, as soft contact lenses, and for other purposes. However, their use is limited due to the fact that the amount of aqueous liquid retention is limited and also due to the fact that the physical properties of the polymers cannot be greatly modified due to the low degree of cross-linking possible.

Thus, it is well known that biocompatibility and optical properties are mainly dependent upon the aqueous liquid content of a hydrogel polymer and further that hemocompatibility is a function of the density of negative charges and high biological fluid equilibrium to prevent rejection.

Thus, it is desirable to provide hydrophilic polymers of higher degree of aqueous liquid retention, of higher possibility of cross-linking and having, if desired, a programmed negative charge density.

SUMMARY OF THE INVENTION

Generally speaking, in accordance with the present invention there is provided a hydrophilic polymer obtained by polymerization of an acrylamido alkyl sulfonic acid monomer, which hydrophilic polymer has the ability to ingurgitate huge quantities of liquid while maintaining shape and physical stability.

It is thus a primary object of the present invention to provide new hydrophilic polymers which are capable of ingurgitating liquid constituents such as water, saline and biological fluids in extremely high quantities of even up to 400 times the weight of the polymer, the liquid constituent permeating the molecular matrix without destruction thereof.

It is another object of the present invention to provide shape retaining hydrophilic polymers capable of absorbing large amounts of water and having a high degree of biocompatibility and optical properties thus making the polymer useful for numerous medical purposes.

It is yet another object of the present invention to provide optically clear, colorless, transparent highly hydrophilic polymers.

It is still a further object of the present invention to provide such hydrophilic polymers which can be cross-linked to a relatively high degree while still retaining the hydrophilic properties thereof.

Other objects and advantages of the present invention will be apparent from a further reading of the specification and of the appended claims.

With the above and other objects in view, the present invention mainly comprises a hydrophilic polymer obtained by polymerization of an acrylamido sulfonic acid or sulfonate monomer of the following formula:

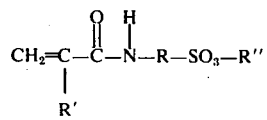

wherein R is straight or branched alkylene of up to 10 carbon atoms, R' is hydrogen or lower alkyl and R'' is a monovalent cation, e.g. hydrogen, sodium, potassium, ammonium, etc.

Thus, the polymers of the present invention have the following general formula:

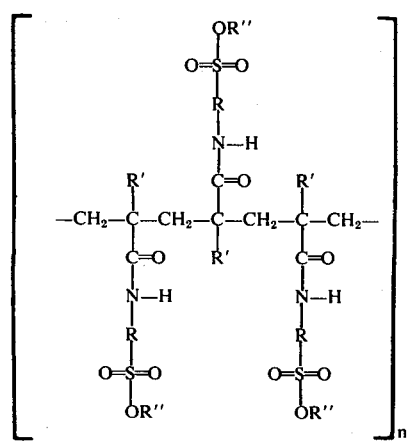

wherein R, R' and R'' have the same definitions as above, and wherein $n$ has a value such that the polymer is in the form of a shape-retaining body. In general, $n$, which corresponds to the degree of polymerization, will have a value of between about 1000 and 100,000.

The most preferred polymer according to the present invention is obtained by polymerizing 2-acrylamido-2-methylpropane-sulfonic acid, in which case the resulting polymer has the following structural formula:

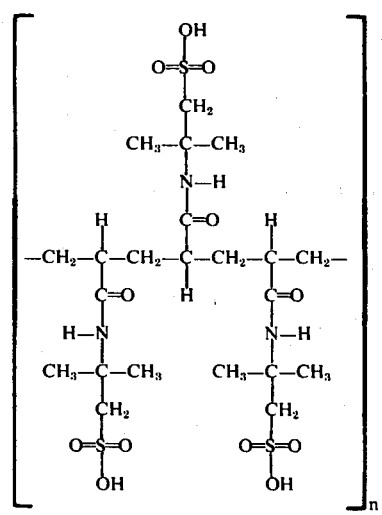

As indicated above, the hydrophilic polymers of the present invention have the property of being able to ingurgitate large quantities of water without adversely affecting the biocompatibility or optical properties, as well as physical stability of the polymer. Thus, while the known hydrophilic polymer is prepared from glycol esters of methacylic and acrylic acids can only retain from 20% to 97% of aqueous liquid, the polymers of the present invention can retain these amounts and much more, even as high as more than 400 times its own weight of water. It is not until these polymers will absorb more than 400 times their own weight of water that there is a deterioration in the physical strength of the polymer. When the hydrophilic polymers of the invention absorb 150 times their original weight of water or aqueous liquid, or even more, the polymers still remain physically strong and stable in addition to remaining biocompatible and retaining their optical properties. Thus, these hydrophilic polymers provide considerable advantage in ophthalmological uses over existing glycol-methacrylate polymers due to the fact that the polymers of the invention are optically clear, colorless and transparent even when absorbing 150 times and more their original weight of water, whereas the glycol-methacrylate polymers become opaque and sponge-like after absorbing more than 50% liquid.

The polymer bodies obtained according to the present invention change their dimension comparably with the amount of aqueous liquid absorbed. This great increase in size means that a large size polymer device can be implanted in dehydrated form by means of a very small incision or cavity and allowed to hydrate to the desired larger dimension, thus eliminating a large incision or opening.

In addition, it is an advantage of the invention that matter can be incorporated into the polymer matrix during polymerization or solubilized in an aqueous liquid and ingurgitated into the dehydrated polymer by hydration and allowed to dry to a constant weight. This absorbed matter will remain encapsulated for any required length of time and can be simply released by hydrating with aqueous liquid or biological fluid.

As a result of the fact that the hydrophilic polymers of the present invention can ingurgitate large quantities of water, and because of the properties of biocompatibility and optical clarity, transparency, etc., these polymers can be used to great advantage for many biological purposes including as dialyzer membranes, materials for cardiovascular, pulmonary and dental purposes, corneal replacement, retina repair, coating of surgical suture material, breast replacement and enlargement including filling of cavities, as soft contact lenses, for wound and burn covering, for controlled release of drugs of antibiotics and of nutrient supplements, in deodorants, as biological membranes, as reconstructive material, for intrauterine purposes, for tissue embedding and as biological ducts.

In addition, the hydrophilic polymers find many industrial applications including as ion exchange resin, dehydrating agents, for industrial dialysis, as growth media as a release film for odors, fumigants, fungicides, bacteriocides, insecticides and rodenticides on buildings, ships and other structures. The polymers can also be used for many other purposes.

The term polymer in referring to the hydrophilic polymers of the present invention has been used in a general sense to include not only homopolymers, but also cross-linked homopolymers, co-polymers, terpolymers or other interpolymers such as grafted polymers and polymer blends.

Many different types of co-monomers can be used to form interpolymers, including the following types of monomers:

1. Esters of unsaturated polyhydric alcohols (e.g. butenediol)
2. Vinyl cyclic compounds (e.g. styrene, vinyl furane, N-vinyl pyrrolidone).
3. Unsaturated acids (e.g. acrylic, methacrylic, propacrylic acid)
4. Unsaturated anhydrides (e.g. maleic, citraconic, itaconic)
5. Unsaturated nitriles (e.g. acrylonitrile, methacrylonitrile)
6. Unsaturated amines (e.g. acrylamide, dimethylaminoethyl methacrylate)
7. Vinyl halides (e.g. vinyl chloride, vinyl iodide, allyl chloride)
8. Unsaturated ketones (e.g. methyl vinyl ketone, ethyl vinyl ketone)
9. Unsaturated ethers (e.g. methyl vinyl ether, diallyl ether)
10. Unsaturated esters (e.g. hydroxyethyl methacrylate, hydroxypropyl acrylate)
11. Unsaturated functional silanes.
12. Alkyl methacrylates (e.g. methyl methacrylate, ethyl methacrylate)

Examples of cross-linking monomers are olefin glycol dimethacrylates such as: ethylene dimethacrylate, diethylene glycol dimethacrylate, triethylene glycol dimethacrylate and higher glycol dimethacrylates.

Pentaerythritol di-, tri- and tetra-methacrylate; diallyl phthalate and other di-, tri- and tetra functional $CH_2 = C$ - group monomers may be used.

The co-monomers can be used to alter the physical properties of the polymer and the amount of aqueous liquid which can be ingurgitated by the polymer. The amount of such co-monomer may be up to 50% of the total, though generally smaller amounts may be used to desirably affect the properties of the final polymer.

As indicated above, it is a considerable advantage of the present invention that the hydrophilic polymers of this invention may be cross-linked to a much greater degree than the known glycol esters of methacrylic and acrylic acids which can only be cross-linked to amounts of less than 1%, and generally less than 0.2%. The polymers of the present invention, on the other hand, can, if desired, be cross-linked by up to 5%, and even more.

A cross-linked polymer formed from 2-acrylamido-2-methylpropane-sulfonic acid and ethylene dimethacrylate has the following structural formula:

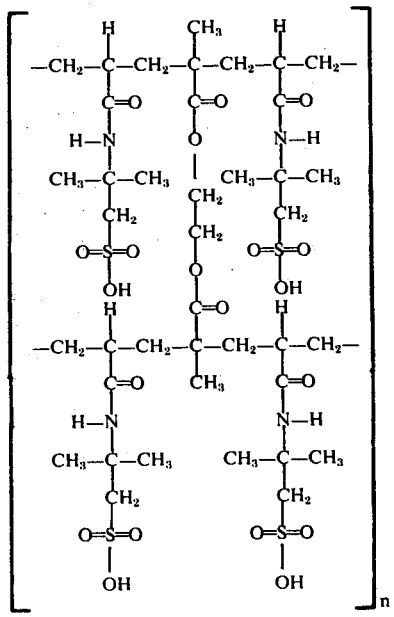

The polymers of the present invention can be easily produced using conventional polymerization techniques such as bulk, solution, suspension or other techniques. In the case of 2-acrylamido-2-methylpropane-sulfonic acid as the monomer, the substance is a white crystalline solid and at ambient temperatures no inhibitor is necessary and additional purification is eliminated. The polymerization of 2-acrylamido-2-methylpropane-sulfonic acid may be initiated by water, by free radical catalyst, redox system, Ziegler type catalyst, irradiation, microwave and thermal techniques.

Among the examples suitable catalysts are benzoyl peroxide, di(isopropyl) peroxydicarbonate, t-butyl peroctoate, bis(4-t-butylcyclohexyl) peroxydicarbonate, isopropyl peroctoate, as well as other free radical organic peroxides. In addition it is possible to use persulfates, redox catalysts such as sodium bisulfite and ammonium persulfate, as well as microwave and thermal initiation.

The hydrophilic polymers of the invention are hard, rigid, clear polymers which swell in water and equilibrate with the water to become a soft gel. In dry state the polymer may be machined and fabricated to conform to any desired physiological shape, or cast polymerized into the desired shape. In either technique, allowance should be made for expansion and change of dimension during and after hydration.

Thus, the hydrogels of the present invention differ from all known hydrogel preparations in that they are softer, can ingurgitate much higher amounts of liquid, have a much shorter equilibrating time, as well as having a different chemical structure and being negatively charged. Furthermore, it is possible to control the degree of liquid ingurgitation and degree of softness by incorporation of various levels of copolymers.

DESCRIPTION OF PREFERRED EMBODIMENTS

The following examples are given to further illustrate the present invention. The scope of the invention is not, however, meant to be limited to the specific details of the examples:

EXAMPLE 1

5 grams of 2-acrylamido-2-methylpropanesulfonic acid are mixed with 4 grams of distilled water containing 2% ammonium persulfate. The addition of 0.014 grams of ethylene dimethacrylate to the solution is mixed well to disperse the dimethacrylate. The mixture is poured into a test tube and nitrogen is bubbled through the mixture. The test tube is placed in a constant hot water bath at 55° – 60°C for 20 minutes. After 20 minutes, the test tube containing the polymer is cooled and the rod shaped polymer removed. The polymer is cut into discs and placed in an oven at 80°C for 3 hours to post-cure and dehydrate. The polymer is then vacuum dried overnight. The dry polymer discs are hard, rigid, clear and colorless. A disc is placed in (1) distilled water, (2) iso-tonic solution for 24 hours. After 24 hours, the discs gain 15,000 % (water) and 3,000 % (iso-tonic solution) over original weight. The hydrated polymer is soft, optically clear and colorless.

EXAMPLE 2

Using the same procedure as in Example 1 and placing the disc in a saturated solution of sodium bicarbonate. Bubbling evolved indicating carbon dioxide release and neutralization of the sulfonic acid groups. The polymer was leached in excess water to remove any residual sodium bicarbonate. The disc was dried, weighed and re-hydrated. The water pick-up was similar to Example 1. The hydrated neutralized polymer is soft, optically clear and colorless.

EXAMPLE 3

4 grams of 2-acrylamido-2-methylpropanesulfonic acid and 1 gram hydroxyethyl acrylate are mixed with 4 grams of 2 % ammonium persulfate in distilled water and 0.014 grams ethylene dimethacrylate. The same procedure is used as in Example 1. After 24 hours of hydration, 2,700 % (water) and 1,200 % (iso-tonic solution) are absorbed. The hydrated co-polymer is soft, optically clear and colorless.

EXAMPLE 4

4 grams of 2-acrylamido-2-methylpropanesulfonic acid, 0.5 grams of hydroxyethyl acrylate and 0.5 grams of hydroxypropyl acrylate are mixed with 0.014 grams of ethylene dimethyacrylate and 4 grams of distilled water containing 2 % ammonium persulfate. The same procedure is used as in Example 1. The aqueous pickup after 24 hours of of hydration are 3,600 % (water) and 1,300 % (iso-tonic solution). The hydrated ter-polymer is soft, optically clear and colorless.

EXAMPLE 5

4 grams of 2-acrylamido-2-methylpropanesulfonic acid, 1 gram of dimethylaminoethyl methacrylate and 0.014 grams of ethylene dimethacrylate are mixed with 4 grams of distilled water containing 2 % ammonium persulfate. The same procedure is used as in Example 1. The aqueous pickup after 24 hours of hydration are 4,400 % (water) and 1,200 % (iso-tonic solution). The hydrated co-polymer is soft, optically clear and exhibits a slight straw color.

EXAMPLE 6

25 grams of methyl methacrylate, 25 grams of 2-acrylamido-2-methylpropane-sulfonic acid, 140 cc of isopropyl alcohol and 0.3 grams of t-butyl peroctoate are charged into a 250 ml. flask with a condenser, thermometer and stirrer. Nitrogen is bubbled through and blankets the polymerization mixture. The mixture is heated to reflux (86°C) and the reflux temperature is maintained for 14 hours. If the solution is turbid, 5 cc of distilled water are added, before reflux, to clear the solution. After 14 hours at reflux temperatures, 95 cc of solvent are removed. The polymerization mixture is removed and a thin film is casted on a glass plate. The polymer film is left to air-dry. The film is hard, clear and colorless.

EXAMPLE 7

25 grams of 2-acrylamido-2-methylpropanesulfonic acid, 12.5 grams of hydroxyethyl acrylate, 12.5 grams of methyl methacrylate, 150 cc isopropyl alcohol and 0.3 grams of bis(4-t-butylcyclohexyl) percarbonate are subjected to the same procedure as in Example 6. The polymer film is hard, clear and colorless.

EXAMPLE 8

Ammonium Salt of Acrylamido-2-Methylpropane Sulfonic Acid.

6.0 cc of water are added to 10.0 cc of ammonium hydroxide. 20.7 grams of acrylamido-2-methylpropane sulfonic acid and 0.05 grams of ethylene dimethacrylate are added. The reaction mixture is mixed in a small beaker with 4.0 cc of 4 % ammonium persulfate solution as catalyst and allowed to polymerize at room temperature.

When hydrated, the polymer is soft, clear and colorless.

EXAMPLE 9

Sodium salt of Acrylamido-2-Methylpropane Sulfonic Acid

The same procedure is used as in Example 8 except for the use of 4.0 grams of sodium hydroxide in 15.0 cc of water instead of ammonium hydroxide and ammonium persulfate solution.

When hydrated, the polymer is soft, clear, and colorless.

EXAMPLE 10

N-Vinyl-2-Pyrrolidone as Co-Polymer 2.0 grams of acrylamido-2-methylpropane sulfonic acid, 2.0 cc of 4 % ammonium persulfate and 0.01 grams of ethylene dimethacrylate are mixed in a small beaker. 0.5 grams of N-vinyl-2-pyrrolidone are added and mixed and allowed to polymerize in the oven at 90° C – 100° C.

A rust colored, soft hydrophilic polymer is formed.

EXAMPLE 11

Acrylic Acid as Co-Polymer 2.0 grams of acrylamido-2-methylpropane sulfonic acid, 2.0 cc of 4 % ammonium persulfate, and 0.01 grams of ethylene dimethacrylate are mixed in a small beaker. 0.5 grams of acrylic acid are added and mixed. The reaction mixture is allowed to polymerize in the oven at 90°C – 100°C.

A clear, hard hydrophilic polymer is formed.

EXAMPLE 12

Hydroxymethyl Diacetone Acrylamide as Co-Polymer 2.0 grams of acrylamido-2-methylpropane sulfonic acid, 2.0 cc of 4 % ammonium persulfate and 0.01 grams of ethylene dimethacrylate are mixed. 0.5 grams of hydroxymethyl diacetone acrylamide are added and mixed. The reaction mixture is allowed to polymerize in the oven at 90° C – 100° C.

A straw-colored, elastic hydrophilic polymer is formed.

EXAMPLE 13

Diacetone Acrylamide as Co-Polymer 0.72 grams of diacetone acrylamide are dissolved in 2.0 cc of water and 2.0 cc of 4 % ammonium persulfate. 0.04 grams of ethylene dimethacrylate are added and mixed in a small beaker. 2.88 grams of acrylamido-2-methylpropane sulfonic acid are added and mixed in a beaker. The reaction mixture is allowed to polymerize in the oven at 90° C. – 100° C.

A clear, colorless hydrophilic polymer is formed.

EXAMPLE 14

Methyl Methacrylate as Co-Polymer 2.0 grams of acrylamido-2-methylpropane sulfonic acid are dissolved in 2.0 cc of water. 0.01 grams of benzoyl peroxide are added to 0.5 grams of methyl methacrylate. The two are mixed and allowed to polymerize in the oven at 90° – 100° C.

A clear, colorless hydrophilic polymer is formed.

The present invention, in addition to providing new hydrophilic polymers also provides hydrogels comprising 20 % – 400 %, and preferably 100 % – 200 % of an aqueous liquid plus the hydrophilic acrylamido polymer of this invention. These hydrogels containing the large amount of aqueous liquid can be in the form of shaped bodies, and such shaped bodies are comprehended within the scope of the present invention.

While the invention has been described in particular with respect to certain specific hydrophilic polymers, hydrogels and shaped bodies thereof, it is to be understood that variations and modifications of the invention can be made without departing from the spirit or scope thereof.

What is claimed is:

1. A water insoluble cross-linked hydrophilic polymer capable of absorbing many times its own weight of water, said polymer consisting essentially of at least 95% by weight of a polymerized monomer of the formula:

$$CH_2=\underset{R'}{\overset{}{C}}-\overset{O}{\overset{\|}{C}}-\overset{H}{\overset{|}{N}}-R-SO_3-R''$$

wherein R is selected from the group consisting of straight and branched chain alkylene of up to 10 carbon atoms, R' is selected from the group consisting of hydrogen and lower alkyl, and R'' is a monovalent cation cross-linked by up to 5% by weight of a cross-linking monomer.

2. Water insoluble cross-linked hydrophilic polymer according to claim 1 wherein said cross-linking monomer is selected from the group consisting of olefin glycol dimethacrylates, pentaerythritol di-, tri- and tetra-methacrylates and diallyl phthalate.

3. Water insoluble cross-linked hydrophilic polymer according to claim 2 wherein R'' is selected from the group consisting of sodium, potassium and ammonium.

4. Water insoluble cross-linked hydrophilic polymer of claim 2 wherein R is methylpropane, R' is hydrogen and R'' is hydrogen.

5. Cross-linked water insoluble hydrophilic polymer according to claim 1 wherein 2-acrylamido-2-methylpropane-sulfonic acid is cross-linked with ethylene dimethacrylate.

6. Water insoluble cross-linked hydrophilic polymer of claim 1 wherein R is methylpropane and R' is methyl.

7. Water insoluble cross-linked hydrophilic polymer of claim 6 wherein R'' is hydrogen.

8. A shaped hydrogel body comprising more than 50% by weight of an aqueous liquid and the balance being substantially the water insoluble cross-linked hydrophilic polymer of claim 1.

9. Shaped hydrogel body according to claim 8 wherein said polymerized monomer is 2-acrylamido-2- methylpropane-sulfonic acid and said cross-linking agent is ethylene dimethacrylate.

10. Shaped hydrogel body according to claim 8 wherein the amount of aqueous liquid is between about one half and 150 times the weight of said water-insoluble cross-linked hydrophilic polymer.

11. Shaped hydrogel body according to claim 10 wherein said polymerized monomer is 2-acrylamido-2-methylpropane-sulfonic acid and wherein said cross-linking agent is ethylene dimethacrylate.

* * * * *